United States Patent [19]

Phelps et al.

[11] Patent Number: 5,207,968
[45] Date of Patent: May 4, 1993

[54] METHOD FOR MAKING A DIMENSIONALLY STABLE GREEN CERAMIC SHEET

[75] Inventors: Frankie E. Phelps, Washington Twp; Clement E. Valchar, Lower Burrell; Robert A. DiMilia, Export, all of Pa.

[73] Assignee: Aluminum Company of America, Pittsburgh, Pa.

[21] Appl. No.: 701,046

[22] Filed: May 16, 1991

[51] Int. Cl.$^5$ .................... B29C 71/00; C04B 41/81
[52] U.S. Cl. ................................. 264/344; 264/63; 264/340
[58] Field of Search ................ 264/63, 344, 343, 340

[56] References Cited

U.S. PATENT DOCUMENTS

| | | | |
|---|---|---|---|
| 2,939,199 | 6/1960 | Strivens | 264/63 |
| 2,966,719 | 1/1961 | Park | 264/63 |
| 3,379,943 | 4/1968 | Breedlove | 317/258 |
| 3,502,520 | 3/1970 | Schwartz | 156/6 |
| 3,953,562 | 4/1976 | Hait et al. | 264/63 |
| 4,104,345 | 8/1978 | Anderson | 264/63 |
| 4,283,360 | 8/1981 | Henmi | 264/63 |
| 4,497,677 | 2/1985 | Sanada et al. | 156/89 |
| 4,808,365 | 2/1989 | Kellner | 264/344 |
| 5,043,117 | 8/1991 | Adachi | 264/344 |

FOREIGN PATENT DOCUMENTS 221674 10/1957 Australia .................... 264/63

*Primary Examiner*—James Derrington
*Attorney, Agent, or Firm*—Alfred D. Lobo; David W. Pearce-Smith

[57] ABSTRACT

A essentially solvent-free green sheet (or "card") of fine powder particles of frit held together with an organic binder containing an essentially water-insoluble thermoplastic synthetic resin can be dimensionally stabilized by a process which utilizes the physical interaction of aquathermic stimuli on the green card. The process includes contacting the card with liquid water or moisture-saturated air or inert gas (which gas, like water, has no noticeable chemical action on the organic binder) at a temperature in the range from about the freezing point (0° C.) to about the boiling point of water (100° C.) and drying the card until essentially all the moisture from within the pores of the cards is removed before the cards are circuitized with metallurgy. The green cards which are then essentially free of both moisture and solvent, are allowed to equilibrate at storage temperature for a period of at least about 10 minutes before being processed further.

20 Claims, No Drawings

METHOD FOR MAKING A DIMENSIONALLY STABLE GREEN CERAMIC SHEET

BACKGROUND OF THE INVENTION

This invention relates to a method for manufacturing an essentially solvent free and dry, dimensionally stable laminar sheet of ceramic and/or glass powder particles ("frit") bound together with an organic polymer, typically in combination with a plasticizer. The polymer and plasticizer are together referred to herein as the "binder". The term "solvent" refers to a solvent for the binder, and also to a solvent for conductive paste used to provide the circuits in a multilayer or multilevel ceramic laminate ("MLC"); the term "dry" refers to solvent free and moisture free. The sheet is formed from a continuously cast slip comprising a solvent for the organic binder in combination with dispersants, surfactants or wetting agents, etc. for the frit. Though the sheet might be formed entirely of either ceramic or glass particles, the frit used for the sheet of this invention, like sheet conventionally used for the purpose herein, typically consists essentially of a major proportion by weight of a ceramic powder and a minor proportion by weight of glass powder. The sheet is, therefore, referred to herein as a "ceramic sheet" which is formed from "ceramic powder". Ingredients are chosen to give the slip desirable casting and "doctoring" (because the slip is doctored onto a belt with a blade) characteristics.

A cast sheet of ceramic powder is generally in the range from about 2 mils to about 40 mils thick and of arbitrary length and width, generally less than about 5.5 feet (about 1.65 meters). A sheet which is less than 8 mils thick is referred to as "thin" sheet to emphasize its rather fragile characteristics relative to "normal" sheet which is in the range from about 8 mils to 15 mils thick. Still thicker sheet may be made for particular purposes, not necessarily for mounting microprocessor chips, for example, mounting board for electronic components subjected to high temperatures.

After most of the solvent for the organic binder is removed from the cast sheet it is cut into pieces. Each piece of the sheet is familiarly referred to as a "card". The method for making an essentially solvent-free sheet of frit, referred to herein as a sheet of "green frit", and cutting the sheet into cards is not of particular importance but the aforedescribed method sets forth a simple, convenient, and economical way of making a "green" card conventionally.

As one might expect, drying the cast sheet to remove solvent results in shrinkage of the dimensions of the sheet. The purpose of treating the green sheet or the cards cut from the sheet is to shrink the lateral dimensions of the sheet or cards so much that upon subjecting the shrunk sheet or cards to further drying cycles, they shrink so little that they are deemed dimensionally stable.

By "dimensionally stable" is meant that a shrunk card, upon storage for aging, or drying in an oven, or both, shrinks so little that even when it is subjected to successive drying treatments, or successive periods of aging, the cumulative shrinkage is not more than 0.1 mil/inch in the direction of either lateral axis, or either diagonal. The shrinkage in the direction of the vertical axis (decrease in thickness of the card) is too small to be of significance and is ignored with respect to dimensional stability.

If not adequately stabilized despite thorough drying and aging of a green card at elevated temperature above 100° C, the card thereafter continues to shrink when it is stored at room temperature, and as it progresses through subsequent processing steps required for its eventual utilization. Why an unstable card behaves in this manner is not understood. The problem is to negate such instability.

Typically the green cards are punched, screen printed with a conductive metal or metal oxide paste, dried in an oven to drive off the solvent in the paste, and laminated. The cards must be deemed dimensionally stable before they are laminated.

More particularly, a preferred slip is a mixture of alumina powders with a binder consisting essentially of an organic thermoplastic polymer and plasticizer, blended with a suitable organic solvent for each so as to form a doctorable paste. The slip is cast from a slitted nozzle and doctored onto an endless synthetic resinous belt with a blade set with a predetermined gap which determines the thickness of the cast slip. The width of the slip cast into a sheet is limited only by the distance over which a uniform thickness of the cast sheet can be reliably controlled, generally less than about 6 feet (about 2 meters). Because the cast sheet is essentially continuous and relatively narrow, it is also referred to as a "strip".

The strip travels through a drying zone where most of the solvent is removed. The strip is then cut into the cards which are relatively small pieces, usually less than 1.5 ft. × 1.5 ft. (or about 0.5 meter × 0.5 meter), sized to lend themselves to be individually dried and stabilized sufficiently to meet the aforestated criteria for dimensional stability. The cards are then punched to provide "guide holes" which serve as through passages in which reference pins are snugly held.

After the cards are stabilized, they are punched or drilled with "vias" or "through holes" (so termed to distinguish them from guide holes) which serve to provide electrical contact between contiguous cards after they are laminated. Before they are laminated, the cards are screen printed with the conductive paste after each card is precisely positioned by reference pins through the guide holes, or otherwise provided with circuits (referred to as "metallurgy"). The conductive paste, upon being dried and sintered on a card, forms a conductor deposited on the surface of each card. The paste also fills the vias providing card-to-card electrical contact therethrough. The screen printed cards are then dried in an oven to remove solvent from the conductive paste.

Several of the screen-printed green cards are then stacked coextensively in one-to-one correspondence by inserting reference pins through the guide holes in each card, and the stacked cards are bonded under sufficient heat and pressure to form a laminate. The laminate is then cut to desired size and sintered at a temperature above 1000° C. so as to result in a composite module referred to as the MLC. The early use of such MLCs in the electronics industry for the packaging of semiconductors into integrated devices and other elements is disclosed in U.S. Pat. Nos. 3,379,943 to Breedlove and 3,502,520 to Schwartz.

The foregoing problem of stabilizing a green card has drawn critical attention ever since the earliest days of the implementation of technology for making ceramic substrates used in the fabrication of electrical components with desired metallurgy.

One of the earliest solutions to the problem is disclosed in U.S. Pat. No. 3,953,562 to Hait et al. They treated a green sheet with a solvent for the organic binder for enough time to plasticize and soften but not dissolve the binder, then again dried the treated sheet before it was sintered. This solution to the problem relied on controlling the susceptibility of the green sheet to modification of its physico-chemical properties near its surface. Such modification was effected by plasticizing the green sheet, preferably by exposing the sheet soon after it was formed to solvent vapor, then restoring the sheet to its pre-plasticized state.

The criticality of maintaining dimensional stability of each card in a stack of cards prior to firing a MLC is emphasized in the foregoing '562 disclosure relating to the manufacture of MLCs, which disclosure is incorporated by reference thereto as if fully set forth herein, and in the numerous publications referred to therein.

A more recent solution to the problem was disclosed in U.S. Pat. No. 4,497,677 to Sanada et al. Their method for stabilizing a green sheet required pressing a green sheet in a press at a pressure up to 100 kg/cm2 then heating the pressed sheet to a temperature up to 250° C. This approach to solving the problem, relying as it did on directly superimposed physical pressure by contact with a platen of a press, stressed the sheet's susceptibility to physical phenomena, rather than a physico-chemical phenomenon such as a plasticizing effect.

We have found, as did Sanada et al, that superposing physical phenomena upon the green sheet is more reliably effective than superposing physico-chemical phenomenon. We attribute the higher susceptibility of the green sheet to the former rather than the latter, to the fact that (in the '562 process) the green sheet has already been through the physical stage of shrinkage of the plasticized green sheet, before it was dried and re-plasticized. Again drying the re-plasticized sheet does not appear to be as well-directed as using the stimuli of physical phenomena to stabilize the sheet.

Our method, therefore, relies mainly upon superposing physical conditions in a manner which is as simple as it is easily accomplished. However, instead of using direct pressure of a press, as did the '677 method, we use contact with water under preferred temperature conditions. Whether as liquid or vapor (either or both of which are referred to herein as "moisture"), water used in our process, referred to as an "aquathermic" process, has no observable plasticizing effect on the binder and is essentially independent of pressure. The aquathermic process combines contact with moisture supplied in a preselected temperature range to accelerate the time required to dimensionally stabilize a card.

SUMMARY OF THE INVENTION

It has been discovered that an essentially solvent-free green card of fine powder particles of ceramic frit held together with an organic binder comprising an essentially water-insoluble thermoplastic synthetic resin can be shrunk so that it is dimensionally stabilized, by a process which utilizes the physical interaction of aquathermic stimuli on the green card. In this process, we refer to one in which each card is either individually treated one card at a time, or, more preferably, a multiplicity of cards, one separated from another (so that they are not stacked), are together subjected to the same treatment at the same time. The process comprises contacting the green card with liquid water, or moisture-saturated air or inert gas (which gas, like water, has no noticeable chemical action on the organic binder), at a temperature in the range from about the freezing point (0° C.) to about the boiling point of water (100° C.), and drying the card until essentially all the moisture from within the pores of the cards is removed. The green cards, which are then essentially free of both moisture and solvent, are allowed to equilibrate at storage temperature for a period of at least about 10 minutes, preferably more than 30 minutes, before being processed further. By "essentially free of both moisture and solvent" we refer to less than 0.1% by weight (1000 ppm) of either solvent or water being present in the dimensionally stabilized green card.

It is, therefore, a general object of this invention to dimensionally stabilize a green card by a process comprising contacting an essentially solvent-free green card with moisture at a temperature in the range from about 0° C. to about 100° C. in a humidifying zone essentially free of a solvent for binder; maintaining the card in contact with the moisture for sufficient time to allow the moisture thoroughly to contact the card, thus humidifying it; drying the humidified card until essentially all the moisture, if present, is removed; and, maintaining the dried green card at ambient temperature in the range from about 10° C. to about 30° C. for at least 10 minutes, preferably more than 30 minutes, to cool the card. The humidified and cooled green card, now dimensionally stabilized, may then be stored for further processing, or, further dried in a convection oven at a temperature in the range from about 50° C. to about 90° C., and then stored.

It has also been discovered that contact of the water-insoluble thermoplastic synthetic resinous component (polymer) of binder with moisture unexpectedly affects shrinkage, and that the combined effect of water and temperature on shrinkage is quite different from the effect of either one alone. Aquathermically shrunk tape exhibited dimensional stability which is at least 10 times better (one order of magnitude) than tape which has been aged under drying conditions alone in the absence of contact with a moisture-saturated atmosphere at elevated temperature above ambient.

It is, therefore, another general object of this invention to provide a single shrink treatment which dimensionally stabilizes a laterally supported green card, the shrink treatment comprising the foregoing process steps, which steps shrink an essentially solvent-free green card to dimensions such that further shrinking is unnecessary because the treated card is dimensionally stabilized.

In one specific preferred embodiment of this invention, we provide a method for manufacturing a dimensionally stable green card in an aquathermic process in which shrinkage (mil/inch) of any of the card's lateral dimensions occurs in a temperature- and moisture-controlled atmosphere; and, such shrinkage does not significantly increase after the card is subsequently dried at elevated temperature up to about 200° C. prior to lamination of the card with a second card. Another specific embodiment of the process comprises contacting the green card in a humidifying zone with a relatively humid atmosphere in the range above 50% relative humidity (RH), preferably from 70 to 100% RH, at a temperature in the range from about 40° C. to about 95° C.; maintaining the humid atmosphere for sufficient time, at least 1 minute, to allow the water vapor to contact and permeate the pores of the green card; removing any moisture, if present, on the surfaces of the humidified card; and storing the dried card in ambient atmosphere above about 10° C. for a period of at least 10 minutes, preferably from 30 minutes to 8 hours, prior to laminating the card with the second card. After stabilization, the cards may be dried in an oven at a temperature below 200° C., preferably below 100° C., without shrinking more than 0.1 mil/inch in the direction of either lateral axis, or either diagonal axis, whereby the cards are deemed dimensionally stable for further processing.

In another specific preferred embodiment of this invention a green card is dimensionally stabilized by a process comprising: (i) contacting the card with a relatively moisture-free atmosphere having less than about 30% and preferably from about 10 to 15% RH, at a temperature in the range from about 40° C. to about 95° C. for at least 1 minute but less than about 1 hour, to ensure that the card is essentially solvent free; (ii) soon thereafter increasing the RH to 100% and maintaining a temperature in the range from about 60° to 95° C. for sufficient time, at least 1 minute, to allow the water vapor to permeate the pores of the green card; (iii) exhausting the moist air and replacing it with dry air so that the RH drops to below 30%, preferably from about 10 to 15%, while maintaining a temperature in the range from about 60° to 95° C., until substantially all the moisture from the surfaces and within the pores of the cards is removed; and (iv) storing the dried green card at storage temperature in the range from about 20° to 30° C. for at least 10 minutes, and preferably more than 1 hour to cool the card.

DETAILED DESCRIPTION OF THE PREFERRED EMBODIMENTS

It is recognized that the conventional thermal treatment of tape is either by (i) drying in a convection oven at elevated temperature above ambient, or, (ii) drying at ambient under prevailing atmospheric moisture conditions which on occasion may be saturated. However, drying method (i) fails to provide adequate stabilization because the RH is too low in the oven, and drying method (ii) may take days even if the atmosphere happens to be at 100% RH. The problem is to provide dimensionally stabilized cards in a period short enough to make the commercial production of such cards economical.

The process of this invention may be carried out on a continuously cast sheet which is led through a separate humidifying zone after it is solvent dried. The dimensionally stabilized sheet is then cut into cards before being circuitized with appropriate metallurgy and further processing. The process may also be carried out in a batch process. By a "batch" process (used herein to provide the data set forth in the accompanying Tables for the numerous cards tested), we refer to one in which a multiplicity of cards are treated in a humidifying zone subjected to distinct cycles of processing conditions. In either a continuous or batch process, it will be appreciated that economics dictate that the time the strip (or cards) spends being shrunk in a humidifying zone be less than about 1 hour, preferably less than 30 minutes, and more preferably no more than between about 5 minutes to about 15 minutes.

Any ceramic frit (powder), optionally mixed with glass frit, such as is conventionally used for the fabrication of electrical components, may be used in our process. Ceramic frits used include alumina, aluminum silicate, cordierite, mullite, spinel, forsterite, barium titanate, magnesium silicate, steatite, titanium dioxide, zircon, zirconium dioxide, and the like, and combinations thereof. Most preferred is alumina.

As stated hereinabove, glass frit may be used alone or in combination with one or more of the ceramic frits identified hereinabove. When used, and it is conventionally used, glass frit is present in a minor proportion by weight, preferably less than 10%. Such glass frits include the alumina silicate glasses, lead borate, lead silicate, borosilicate, lead borosilicate, titanium silicate, cadmium borate, lead-cadmium borosilicate, zinc borosilicate and sodium-cadmium borosilicate frits, fused silica and silica glass.

The ceramic and glass frit is in the form of a fine powder, typically less than 325 mesh (U.S. Standard Series), but the primary particle size of the powder is not narrowly critical. The size range of particles for a frit is determined by the end use of the MLC.

The amount of binder used to form a castable slip depends upon the particular physical properties sought in the dimensionally stabilized cards which are to be laminated. Generally a dry (solvent free and moisture free) card comprises about 80 to 95% by weight of frit with from about 20 to 5% by weight of binder, the higher proportion of frit being favored to yield a dimensionally stabilized card. It is most preferred to use from about 6 to 10% by weight binder.

The physical properties of the slip to be cast are tailored to suit the process conditions under which it is to be cast and dried, the viscosity being chosen for optimum control of the thickness of the slip as it is doctored onto an endless belt.

The thermoplastic polymer used in the binder is chosen for its film-forming ability when dissolved to yield a syrup with a relatively easily-volatilized solvent and because it is essentially insoluble in water. A solution of a polymer with a preferred number average molecular weight in the range from about 10,000 to about 200,000 or more, optionally in combination with a plasticizer, provides a binder for a castable slip of ceramic particles. When used, the plasticizer is preferably soluble in water so that it migrates from the binder into water because it dissolves therein. The plasticizer need not be soluble but may be insoluble or have only limited solubility in water. When present, it is in a minor proportion by weight, the ratio of polymer to plasticizer being in the range from about 1.2 to 10 parts polymer per part of plasticizer by weight, preferably from 1.3 to 3 parts. By "limited solubility" is meant that the solubility is less than 10 parts of solubilizer in 100 parts by weight of water at casting temperature. A slip is cast in a preferred thickness range of from about 2 mils to 18 mils.

The solvent is chosen for its ability to dissolve the resin at the casting temperature, typically about 20° C. (ambient), and form a solution in which the particles of ceramic frit are substantially homogeneously distributed, forming a castable paste. Further, the solvent should be easily and thoroughly volatilized when the cast slip is dried.

The polymer is chosen because it is essentially insoluble in water with which it has an interaction analogous to that with polyvinyl butyral (PVB), and for the polymer's ability to be cleanly volatilized when cards cut from the cast slip are laminated and sintered.

Useful commercially available thermoplastic polymers in a molecular weight range suitable for the purpose at hand are chosen from groups generically designated as polyvinyl butyrals, polyvinyl acetates, acrylates and methacrylates and copolymers thereof which are tailored to provide requisite flexibility. Such aquathermically sensitive polymeric materials and preferred binder systems for MLCs may be selected from those disclosed in "Polymer Handbook" by J. Brandrup and E. H. Immergut, Interscience Division of John Wiley & Sons, New York, 1966, and other publications.

Most preferred is polyvinyl butyral (PVB) having a molecular weight in the range from about 40,000 to about 150,000. The molecular weight is determined by size exclusion chromatography with the low angle laser light scanning method (of Cotts and Ouano) in THF (tetrahydrofuran). The solution viscosity of the polymer ranges from 100 cp to 14,000 cp for a 15% by weight solution. The solution viscosity is determined in 15% by weight solutions in 60:40 toluene:ethanol at 25° C. using a Brookfield viscometer. A specific preferred PVB is ButvarR, which is commercially available from Monsanto Company.

The thermoplastic polymer of the binder may be used alone, but is more typically used in combination with a plasticizer and other additives such as surfactants, emulsifiers, and the like which are dispersible in the solution of resin. When used, such additives are typically present in no more than about 5% by weight. Like the resin, the additives are volatilized when the dimensionally stabilized card, or a laminate of plural dimensionally stabilized cards, is sintered. The plasticizer imparts flexibility to the cast slip, and provides desirable physical characteristics to a dimensionally stabilized card which allows it to be laminated to another card. A surfactant is typically used to facilitate wetting of the ceramic frit particles by reducing the interfacial tension between the particles and the solution. A wide range of plasticizers and surfactants may be employed in the binder. The choice of a particular combination is made by one skilled in the art in accordance with known parameters and such choice, per se, forms no part of the invention claimed herein.

A preferred embodiment of the invention may be practiced by maintaining a green card in a humidifying zone for a predetermined time in the temperature range from about 60° C. to about 85° C. in any one of two modes depending upon the physical state of the moisture which is maintained in contact with a green card. The duration of contact with moisture, added to the time during which the humidified card is held at ambient temperature in the range from about 30° C. to about 60° C. below that at which the card is humidified, is the time for a single treatment. Whichever mode is chosen, it is preferred to obtain maximum shrinkage during a single treatment.

In any mode, dimensional stability of a shrunk card is determined by further shrinkage of the binder which is in a stressed state and is naturally driven to a less stressed state. This is evident by the shrinkage that is observed upon subjecting a shrunk card to further drying cycles.

As indicated hereinabove, temperature and organic solvents have long been known to alter the dimensions of tape due to shrinkage. Thermal treatment alone results only in partial, unsatisfactory dimensional stability. When partially stabilized 10 mil thick tape is exposed to subsequent thermal cycling, dimensional changes of 0.13 mils/inch are observed. When the card is then processed through additional steps required to yield a MLC, an overall dimensional change of 0.6-0.7 mils/inch is observed. This amount of shrinkage is predictable in the partially stabilized tape. This predict ability combined with such change is an improvement over untreated cards which move 1.5 mils/in. during the building process, but such predictable shrinkage is still unsatisfactory in a commercial process.

The mechanism by which a card is rendered stable is not fully understood. What is now known is that the interaction of water with the binder at an elevated temperature above ambient causes a laterally supported card to experience so substantial a dimensional change (shrinkage), that it becomes dimensionally stabilized. The extent of this shrinkage generally determines whether the tape is dimensionally stabilized, the higher the shrinkage, the more stable the tape, though it should be recognized that there is no direct correlation between the net shrinkage of a card and whether it is dimensionally stabilized.

In each of the preferred embodiments of the invention, the tape is cut into cards which are then stabilized in a humidifying zone while they are laterally supported. Therefore all the following stabilization treatments are described for cards, which after treatment, are measured to determine whether they are dimensionally stabilized. Measurement is most preferably done as follows: a green card freshly cut from tape, is bored near each corner resulting in four holes, each about 10 mils in diameter, one in each corner. The holes serve as reference points for measurement of the lateral dimensions of a card by a computerized optical measuring means such as a VIEW Model BAZIC-8 programmable optical coordinate measuring means commercially available from View Engineering, Inc., Simi Valley, Calif.

The machine makes two measurements along the x-axis, one each between the centerlines of the upper and lower pairs of holes near the upper and lower edges, respectively, of the card and averages the measurements. This average is presented in the Tables appended hereto as "X". In an analogous manner, the machine makes two measurements along the y-axis, one each between the upper and lower pairs of holes near the left and right edges, respectively, of the card and averages the measurements. This average is presented in the Tables as "Y". Finally, the machine makes two diagonal measurements between each pair of diagonally opposite holes and averages the measurements. This average is presented in the Tables as "D". The three dimensions X, Y and D, referred to herein as lateral dimensions because they are in the same lateral plane, are again averaged. This computed average is presented as the "overall" dimension.

In each of the Tables, shrinkage is measured under "Stabilization" and the tests for dimensional stability are reported under "Dry Cycle" at the end of which any further shrinkage is measured.

Preferred embodiments for contacting the card with water are as follows: (a) bathing the card in (liquid) water, optionally containing an agent to prevent leaching out plasticizer from the binder, referred to herein as a "plasticizer non-leaching agent"; and (b) exposing the tape to a high RH atmosphere in the range from about 70% to about 100% RH, preferably about 100%. Each embodiment is described in further detail as follows:

(a) Bathing the Card in an Aqueous Bath:

(i) In Cold Water: A card is heated in a convection oven to a temperature in the range from about 40° C. to about 120° C., held there for a sufficient time in the range from about 0.5 second to about 5 minutes to ensure that the solvent is removed. The card is then quickly removed from the oven and quenched in an ice-water bath and left in the bath until the card reaches the bath temperature, about 30 seconds. The card is removed from the bath, excess water is blotted off the surface and the card allowed to air dry at room temperature.

The dried card appears stiff even after equilibrating at room temperature. This may be a benefit in downstream handling of a thin card (i.e., less than 8 mil thick). However, when the stabilized card is exposed to a thermal cycle (such as by drying) the card returns to "normal", i.e., appears to have the same physical characteristics of flexibility and pliability as untreated card. The treated card is dimensionally stable as evident from Table I below, in which the time of submersion of each card of statistically significant set of cards, the temperature of each bath, and the resulting shrinkage, are set forth.

plasticizer being leached from the surface of the tape by the water. The observed weight loss ranges from about 0.5 to 0.6%. This loss is substantially reduced by the addition of the plasticizer non-leaching agent such as dietheylene glycol or polyalkylene glycol to the water. That the leaching of the plasticizer has been suppressed is evident from the observed weight loss which has been reduced to about 0.1 to 0.2%. The samples bathed in the water/glycol solution, as well as those bathed in water alone, were laminated and sintered with comparable ease. As earlier stated, if stiff, stable cards may be given a heating treatment in a drying oven at from 60° to 100° C. to restore their flexibility.

(ii) In Heated Water: In a manner analogous to that described hereinabove, cards are bathed in hot water in the range from about 40° C. to boiling. Tests for cards bathed at temperatures of 45° C. and 60° C. for varying lengths of time are set forth in Table II. It is evident that tape bathed for only 1 minute in 60° C. water is dimensionally stabilized. In comparison, it takes 3 minutes in 45° C. water to get the same results.

TABLE II

Stabilization by Immersion in Hot Water and Air Cooling or Ice Water Quenching

| Hot Water Immersion | | | Dimensional Change - mil/inch | | | | | | | |
|---|---|---|---|---|---|---|---|---|---|---|
| Time Min. | Temp. °C. | Cooling | Stabilization | | | | Dry Cycle(1) | | | |
| | | | X | Y | D | Overall | X | Y | D | Overall |
| 0.5 | 60 | Air Cooled | 2.63 | 3.05 | 2.88 | 2.85 | 0.023 | 0.035 | 0.025 | 0.028 |
| 1.0 | 60 | Air Cooled | 2.85 | 3.26 | 3.07 | 3.06 | 0.014 | 0.005 | 0.014 | 0.011 |
| 2.0 | 60 | Air Cooled | 3.10 | 3.70 | 3.43 | 3.41 | +0.001 | +0.006 | +0.015 | +0.007 |
| 0.5 | 45 | Air Cooled | 1.95 | 2.47 | 2.25 | 2.22 | 0.058 | 0.079 | 0.058 | 0.065 |
| 1.0 | 45 | Air Cooled | 2.35 | 2.68 | 2.52 | 2.52 | 0.040 | 0.055 | 0.044 | 0.046 |
| 2.0 | 45 | Air Cooled | 2.22 | 2.83 | 2.56 | 2.54 | 0.010 | 0.047 | 0.030 | 0.029 |
| 3.0 | 45 | Air Cooled | 2.63 | 2.99 | 2.83 | 2.82 | 0.006 | 0.025 | 0.014 | 0.011 |
| 1.0 | 45 | 2 min. ice water | 2.04 | 2.38 | 2.25 | 2.22 | 0.040 | 0.040 | 0.030 | 0.037 |
| 1.0 | 45 | 5 min. ice water | 1.95 | 2.46 | 2.24 | 2.22 | 0.040 | 0.022 | 0.022 | 0.020 |
| 3.0 | 45 | 2 min. ice water | 2.19 | 2.53 | 2.39 | 2.37 | 0.004 | 0.010 | +0.001 | 0.004 |
| 3.0 | 45 | 5 min. ice water | 2.30 | 2.61 | 2.48 | 2.46 | +0.010 | +0.012 | +0.007 | +0.010 |
| 1.0 | 60 | 2 min. ice water | 2.51 | 2.82 | 2.67 | 2.67 | 0.001 | 0.043 | 0.017 | 0.020 |
| 1.0 | 60 | 5 min. ice water | 2.19 | 2.59 | 2.43 | 2.40 | 0.012 | 0.052 | 0.030 | 0.031 |
| 3.0 | 60 | 2 min. ice water | 2.94 | 3.17 | 3.10 | 3.07 | +0.018 | 0.027 | 0.003 | 0.004 |
| 3.0 | 60 | 5 min. ice water | 3.01 | 3.62 | 3.37 | 3.33 | +0.025 | +0.021 | +0.016 | +0.021 |

Notes:
(1)Average of four dry cycles, each 8 min. at 80° C.

TABLE I

Results of Stabilization of Ice Water Quenching

| Oven Heating | | Quench | Dimensional Change - mil/inch | | | | | | | |
|---|---|---|---|---|---|---|---|---|---|---|
| Time Min. | Temp. °C. | Time - Min. | Stabilization | | | | Dry Cycle (3) | | | |
| | | | X | Y | D | Overall | X | Y | D | Overall |
| 0.25 | 120 | 5 | 2.41 | 3.05 | 2.83 | 2.76 | 0.018 | 0.032 | 0.025 | 0.025 |
| 0.25 | 100 | 5 | 2.61 | 3.14 | 2.94 | 2.90 | 0.005 | 0.020 | 0.012 | 0.012 |
| 0.25 | 80 | 5 | 1.99 | 2.51 | 2.32 | 2.27 | 0.020 | 0.048 | 0.038 | 0.035 |
| 10.0 | 60 | 5 | 2.77 | 3.26 | 3.10 | 3.04 | 0.035 | 0.040 | 0.038 | 0.038 |
| 10.0 | 40 | 5 | 1.91 | 2.28 | 2.17 | 2.12 | 0.068 | 0.052 | 0.068 | 0.063 |
| 10.0 | 80 | 5 | 2.77 | 2.77 | 2.79 | 2.78 | 0.035 | 0.055 | 0.038 | 0.043 |
| 10.0 | 80 | 2 | 2.62 | 2.70 | 2.66 | 2.66 | 0.040 | 0.060 | 0.065 | 0.055 |
| 10.0 | 80 | 1 | 2.38 | 2.34 | 2.38 | 2.37 | 0.050 | 0.075 | 0.060 | 0.062 |
| 10.0 | 80 | 0.5 | 2.16 | 2.21 | 2.20 | 2.19 | 0.055 | 0.082 | 0.071 | 0.069 |
| 10.0 | 80 | 15 sec. | 2.11 | 2.05 | 2.09 | 2.08 | 0.040 | 0.098 | 0.087 | 0.075 |
| 10.0 | 80 | 5 sec. | 2.05 | 1.97 | 1.99 | 2.00 | 0.060 | 0.108 | 0.090 | 0.085 |
| 10.0 | 80 | 5(1) | — | — | — | — | 0.031 | 0.038 | 0.034 | 0.034 |
| 10.0 | 80 | 5(2) | 1.756 | 1.934 | 1.837 | 1.842 | 0.228 | 0.318 | 0.274 | 0.273 |

Notes:
(1)Quench bath was 10% (by weight) of polyalkylene glycol in water at 32-34° F.
(2)Quench bath was diethylene glycol at 40° F.
(3)Dry cycle was 8 min. at 80° C. except for experiments with glycols, where dry cycle was 10 min. at 60° C.

Though the bathed cards exhibit excellent dimensional stability, they do not laminate as well as conventionally stabilized tape (thermally treated at 80° C. in a convection oven). This problem is attributable to the (b) Exposing the Card to a High Relative Humidity Atmosphere:

(i) Steam Treatment: Live steam is introduced into a humidifying cabinet in which cards are supported on a plastic grid. The steam is not allowed to impinge directly on the cards. The temperature of the card's surface is monitored, and the time of exposure to steam is varied. The cards are then air dried. Subsequent thermal cycling and other dimensional stability data are shown in Table III.

(iii) High Relative Humidity (50–95%): In a manner analogous to that described immediately hereinabove, tests are conducted to investigate the effect of high relative humidities (RH) without condensing moisture on the surfaces. The temperature/humidity profile for each test is monitored. The residence times are com-

TABLE III

Stabilization by Exposure to Steam and Air Cooling or Ice Water Quenching

| Steam Exposure(3) Time Sec. | Cooling | Stabilization | | | | Average Per Dry Cycle(2) | | | |
|---|---|---|---|---|---|---|---|---|---|
| | | X | Y | D | Overall | X | Y | D | Overall |
| 5 | Air cool | — | — | — | (1) | 0.088 | 0.105 | 0.093 | 0.095 |
| 10 | Air cool | — | — | — | (1) | 0.047 | 0.101 | 0.069 | 0.074 |
| 15 | Air cool | — | — | — | (1) | 0.022 | 0.044 | 0.044 | 0.036 |
| 30 | Air cool | — | — | — | (1) | 0.043 | 0.054 | 0.049 | 0.048 |
| 45 | Air cool | — | — | — | (1) | 0.018 | 0.020 | 0.022 | 0.020 |
| 60 | Air cool | 2.568 | 3.034 | 2.794 | 2.798 | 0.020 | 0.020 | 0.016 | 0.019 |
| 90 | Air cool | — | — | — | (1) | +0.004 | +0.006 | +0.004 | +0.005 |
| 120 | Air cool | 2.710 | 3.058 | 2.890 | 2.886 | +0.034 | +0.026 | +0.050 | +0.037 |
| 5 | Ice water quench | — | — | — | (1) | 0.009 | 0.030 | 0.018 | 0.019 |
| 10 | Ice water quench | — | — | — | (1) | +0.025 | +0.015 | +0.018 | +0.019 |
| 15 | Ice water quench | — | — | — | (1) | +0.031 | +0.028 | +0.031 | +0.030 |
| 120 | Ice water quench | 3.552 | 4.190 | 3.934 | 3.892 | 0.006 | +0.062 | +0.059 | +0.038 |

Notes:
(1)Cards were punched and read only after stabilization.
(2)Average of four dry cycles of 8 minutes at 80° C.
(3)Steam chamber was maintained at 80° C.

(ii) 100% Relative Humidity (Fog) Treatment: Cards are placed on polyester cloth stretched across an aluminum frame which is placed inside a preheated cabinet equipped with misting means which injects a water mist or fog into the cabinet. This fog produces 100% RH. The cards are exposed to these conditions for varying times, and the treatment is repeated at different temperatures. When the cards are removed from the cabinet they have water droplets on their surfaces. These droplets are removed conventionally, preferably by drying the cards in a convection oven with dynamic air flow. The time during which the cards are "misted" depends upon the temperature and air flow in the oven.

puted from entry to exit with the humidity range noted. In general, temperatures never dropped more than 1° C. when the cards were introduced into the humidity cabinet, but the RH (%) dropped before it recovered to the desired setting. The tape exposed to humidities less than 90% did not have a condensation problem. Tape exposed to humidities in excess of 90% had water droplets on their top surfaces. In general, as can be seen in Table IV, in the lower portion of which the tests under lower RH conditions are set forth, lower humidities in the range 30-57% did not stabilize the tape sufficiently in the residence times employed in the experiments.

TABLE IV

Stabilization in Fog Chambers

| Stabilization Treatment | | | Post Stabilization Drying | Dimensional Change - mil/inch | | | | | | | |
|---|---|---|---|---|---|---|---|---|---|---|---|
| Humidity % rh | Temp. °C. | Time Min. | | Stabilization | | | | Average per Drying Cycle | | | |
| | | | | X | Y | D | Overall | X | Y | D | Overall |
| 100 | 52 | 5 | Air dry | 1.749 | 1.886 | 1.802 | 1.812 | 0.026 | 0.045 | 0.036 | 0.036 |
| 100 | 52 | 5 | 10 min 60° C. | 1.250 | 1.333 | 1.288 | 1.290 | 0.047 | 0.071 | 0.059 | 0.059 |
| 100 | 52 | 15 | Air dry | 1.690 | 1.947 | 1.732 | 1.790 | 0.040 | 0.045 | 0.041 | 0.042 |
| 100 | 52 | 15 | 10 min 60° C. | 1.536 | 1.736 | 1.618 | 1.630 | 0.049 | 0.057 | 0.050 | 0.052 |
| 100 | 52 | 30 | Air dry | 1.933 | 2.115 | 2.024 | 2.024 | 0.011 | 0.014 | 0.011 | 0.012 |
| 100 | 52 | 30 | 10 min 60° C. | 1.818 | 2.037 | 1.930 | 1.928 | 0.013 | 0.014 | 0.013 | 0.013 |
| 100 | 60 | 2.5 | Air dry | 1.480 | 1.586 | 1.528 | 1.531 | 0.021 | 0.034 | 0.027 | 0.027 |
| 100 | 60 | 5 | Air dry | 1.850 | 1.885 | 1.850 | 1.862 | 0.018 | 0.039 | 0.027 | 0.028 |
| 100 | 60 | 7.5 | Air dry | 2.737 | 2.687 | 2.746 | 2.723 | +0.008 | +0.015 | +0.011 | +0.011 |
| 100 | 60 | 10 | Air dry | 2.312 | 2.556 | 2.448 | 2.439 | 0.005 | 0.009 | 0.004 | 0.006 |
| 95 | 60 | 10 | Air dry | 2.108 | 2.234 | 2.197 | 2.180 | +0.002 | 0.018 | 0.005 | 0.007 |
| 100 | 70 | 2 | Air dry | 2.460 | 2.364 | 2.414 | 2.413 | +0.006 | 0.018 | 0.010 | 0.007 |
| 100 | 70 | 3.5 | Air dry | 2.772 | 2.670 | 2.724 | 2.722 | +0.010 | 0.013 | 0.008 | 0.010 |
| 100 | 70 | 5 | Air dry | 2.422 | 2.369 | 2.370 | 2.387 | +0.015 | 0.000 | +0.002 | +0.006 |
| 82–89 | 70 | 5 | Air dry | 1.386 | 1.466 | 1.424 | 1.425 | 0.020 | 0.039 | 0.027 | 0.029 |
| 78–87 | 70 | 5 | 10 min 60° C. | 1.440 | 1.615 | 1.542 | 1.533 | 0.032 | 0.034 | 0.033 | 0.033 |
| 78–87 | 70 | 10 | Air dry | 2.514 | 2.732 | 2.627 | 2.624 | 0.005 | 0.000 | 0.007 | 0.004 |
| 30–57 | 76 | 5 | Air dry | 1.467 | 1.533 | 1.496 | 1.499 | 0.042 | 0.064 | 0.050 | 0.052 |
| 30–57 | 76 | 5 | 10 min 60° C. | 1.265 | 1.322 | 1.292 | 1.293 | 0.040 | 0.072 | 0.057 | 0.056 |
| 53–72 | 76 | 5 | Air dry | 1.506 | 1.835 | 1.674 | 1.672 | 0.050 | 0.062 | 0.054 | 0.055 |
| 53–72 | 76 | 5 | 10 min 60° C. | 1.264 | 1.382 | 1.323 | 1.323 | 0.072 | 0.082 | 0.073 | 0.076 |
| 68–80 | 76 | 5 | Air dry | 1.572 | 1.764 | 1.670 | 1.669 | 0.008 | 0.022 | 0.015 | 0.015 |
| 68–80 | 76 | 5 | 10 min 60° C. | 2.504 | 1.588 | 1.531 | 1.541 | +0.036 | 0.040 | 0.037 | 0.038 |
| 68–80 | 76 | 10 | Air dry | 2.360 | 2.256 | 2.310 | 2.309 | 0.003 | 0.012 | 0.009 | 0.006 |
| 76–83 | 76 | 5 | Air dry | 2.736 | 2.822 | 2.746 | 2.768 | 0.007 | 0.007 | 0.007 | 0.007 |

From the foregoing observations and data, it will now be evident that the effect of aquathermic stimuli depends on concentration of moisture to which a card is exposed, temperature and time of exposure. An increase in one or all of these parameters generally produces greater dimensional stability. The optimum conditions for a specific embodiment of the process of this invention can be chosen with a little trial and error such as one skilled in the art is accustomed to undertake for the purpose at hand, the essential step being that a green card is to be contacted with moisture at a temperature above about 40° C. for a period of time sufficient to allow water vapor to thoroughly permeate the card. This time may be only a few seconds if the card is to be bathed but will be several minutes if humidified in a high humidity chamber. The time required to equilibrate the card will depend upon the temperature at which it was humidified.

Having thus clearly and objectively stated the problems to be solved and their solution by the invention disclosed herein, and having provided a detailed description and illustrations of the best mode of practicing the invention in which a green card cut from a green ceramic sheet is to be dimensionally stabilized, it is to be understood that no undue restrictions are to be imposed by reason thereof, and particularly that the invention is not restricted to a lavish adherence to the details set forth herein.

Having thus described the invention, what is claimed is:

1. A process for dimensionally stabilizing a green card cut from a cast sheet of frit bound together with a binder, said process comprising,
    (a) contacting said card with moisture at a temperature in the range from about 40° C. to about 100° C., in humidifying zone which is essentially free of a solvent for a water-soluble thermoplastic synthetic resinous component of said binder, said humidifying zone being maintained with a relatively humid atmosphere in the range from 50% relative humidity to 100% relative humidity;
    (b) maintaining said card in contact with said moisture for sufficient time, less than about 1 hr, to allow said moisture thoroughly to contact the card, resulting in a humidified card; and,
    (c) storing said humidified card in ambient atmosphere in the range from about 10° C. to about 30° C. for a period of at least 10 min, whereby upon further drying at a temperature below 200° C., said humidified card shrinks no more than 0.1 mil/inch in the direction of either lateral axis, or either diagonal axis, so as to yield a dimensionally stable green card.

2. The process of claim 1 wherein in step (a), said humid atmosphere is maintained at about 90-100% relative humidity, and in step (d) said card is stored for from 10 minutes to 8 hours.

3. The process of claim 1 comprising, before step (d) and after step (c), drying at least the surfaces of said green card, resulting in an essentially moisture free dried card.

4. The process of claim 1 wherein said binder includes a plasticizer which is soluble in water and is present in a ratio in the range from about 1.2 to 10 of resin per part by weight of plasticizer.

5. The process of claim 1 wherein said humid atmosphere is maintained at a temperature in the range from about 60° C. to about 90° C. for a period in the range from about 5 minutes to about 1 hour.

6. The process of claim 1 wherein said further drying is effected at a temperature below 100° C.

7. The process of claim 1 wherein said card is from about 2 mils to about 40 mils thick.

8. The process of claim 8 wherein said resin is polyvinyl butyral.

9. The process of claim 8 wherein said frit is selected from the group consisting of a ceramic powder and glass, said ceramic powder selected from alumina, aluminum silicate, cordierite, mullite, spinel, forsterite, barium titanate, magnesium silicate, steatite, titanium dioxide, zircon, zirconium dioxide; and said glass frit is selected from the group consisting of alumina silicate glasses, lead borate, lead silicate, borosilicate, lead borosilicate, titanium silicate cadmium borate, lead-cadmium borosilicate, zinc borosilicate and sodium-cadmium borosilicate frits, fused silica and silica glass.

10. A process for dimensionally stabilizing a green card cut from a cast sheet of frit bound together with a binder, said process comprising,
    (a) contacting said card in an aqueous bath which is essentially free of a solvent for a water-insoluble thermoplastic synthetic resinous component of said binder, said aqueous bath being at a temperature in the range from about 0° C. to about 95° C.;
    (b) maintaining said card in said bath at least until said card reaches the temperature of said bath;
    (c) drying said card until essentially all water from within pores of said card is removed; and, p1 (d) storing said dried card in ambient atmosphere in the range from about 10° C. to about 30° C. for a period from 30 min to 8 hr, whereby upon further drying at a temperature below 200° C., said dried card shrinks no more than 0.1 mil/inch in the direction of either lateral axis, or either diagonal axis, so as to yield a dimensionally stable green card.

11. The process of claim 10 wherein said further drying is effected at a temperature below 100° C.

12. The process of claim 10 wherein said binder includes a plasticizer which is soluble in water and is present in a ratio in the range from about 1.2 to 10 of resin per part by weight of plasticizer.

13. The process of claim 10 wherein said aqueous bath contains a plasticizer non-leaching agent.

14. A process for dimensionally stabilizing a green card cut from a cast sheet of frit bound together with a binder, comprising:
    (a) contacting said card with a relatively moisture free atmosphere having less than about 30% relative humidity for less than about 1 hour, at a temperature in the range from about 40° C. to about 95° C., to ensure that the card is essentially solvent free;
    (b) increasing the relative humidity to 100% and maintaining a temperature in the range from about 60-95° C. for sufficient time, but less than about 1 hour, to allow the water vapor to permeate the pores of the green card, resulting in a humidified green card; and
    (c) storing said humidified green card at storage temperature in the range from about 20° C. to 30° C. for at least 10 minutes to cool the card.

15. The process of claim 14 wherein said binder includes a plasticizer which is soluble in water and is present in a ratio in the range from about 1.2 to 10 of resin per part by weight of plasticizer.

16. The process of claim 14 wherein said humid atmosphere at 100% RH is maintained for a period in the range from about 5 minutes to about 1 hour.

17. The process of claim 15 wherein said card is from about 2 mils to about 40 mils thick.

18. The process of claim 17 wherein said resin is polyvinyl butyral.

19. The process of claim 18 wherein said frit is selected from the group consisting of a ceramic powder and glass, said ceramic powder selected from alumina, aluminum silicate, cordierite, mullite, spinel, forsterite, barium titanate, magnesium silicate, steatite, titanium dioxide, zircon, zirconium dioxide; and said glass frit is selected from the group consisting of alumina silicate glasses, lead borate, lead silicate, borosilicate, lead borosilicate, titanium silicate cadmium borate, lead-cadmium borosilicate, zinc borosilicate and sodium-cadmium borosilicate frits, fused silica and silica glass.

20. The process of claim 14, comprising, after step (b) but before step (c), exhausting the moist air and replacing it with dry air so that the relative humidity drops to below 30% while maintaining said temperature in the range from about 60°–95° C., until substantially all the moisture from the surfaces and within the pores of the cards is removed resulting in a dried green card.

* * * * *

UNITED STATES PATENT AND TRADEMARK OFFICE
CERTIFICATE OF CORRECTION

PATENT NO. : 5,207,968
DATED : May 4, 1993
INVENTOR(S) : Frankie E. Phelps et al It is certified that error appears in the above-indentified patent and that said Letters Patent is hereby corrected as shown below:

Col. 14, line 7  Change "8" to --1--.
Claim 8

Col. 14, line 31  After "and,", delete "p1".
Claim 10

Col. 15, line 2  Change "RH" to --relative humidity--.
Claim 16

Signed and Sealed this

Third Day of May, 1994

Attest:

BRUCE LEHMAN

Attesting Officer     Commissioner of Patents and Trademarks